UNITED STATES PATENT OFFICE.

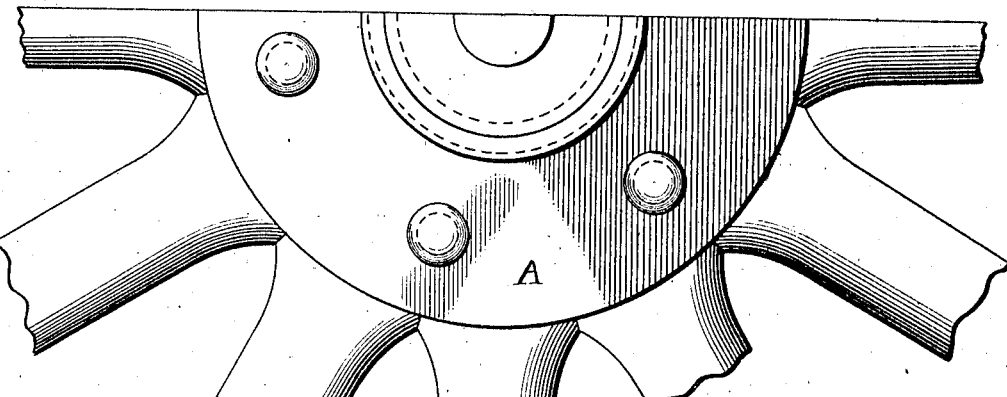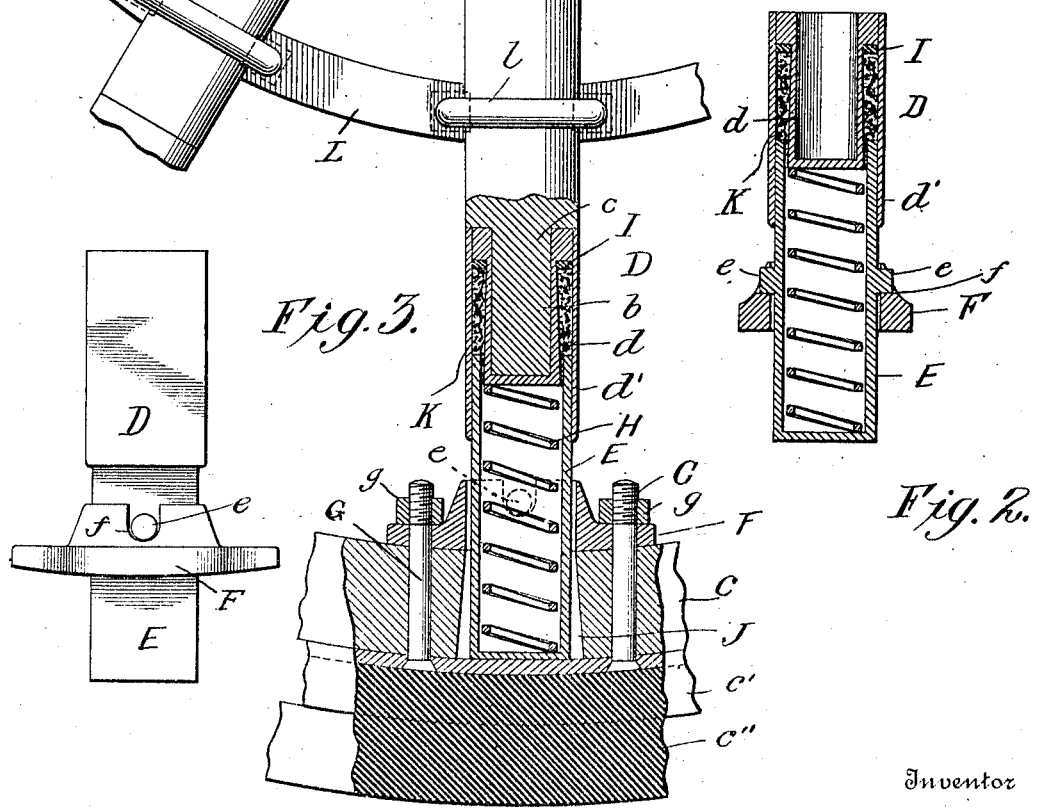

LENU. D. BROOKS, OF ONEONTA, NEW YORK, ASSIGNOR CF ONE-HALF TO CHARLES N. MURDOCK, OF ONEONTA, NEW YORK.

SPRING-WHEEL.

1,054,501.   Specification of Letters Patent.   Patented Feb. 25, 1913.

Application filed August 19, 1912. Serial No. 715,887.

*To all whom it may concern:*

Be it known that I, SILENUS D. BROOKS, a citizen of the United States, residing at Oneonta, in the county of Otsego and State of New York, have invented certain new and useful Improvements in Spring-Wheels, of which the following is a specification.

My invention relates to flexible or spring wheels for wagons, motors and other vehicles; and it has for its object to provide a durable wheel of this type of simple construction and capable of being manufactured at a reasonable price.

In the accompanying drawings—Figure 1 is a view of sufficient of a vehicle wheel to illustrate how my invention is applied thereto, the parts uniting a spoke with a wheel rim being shown in section. Fig. 2 is a central sectional view through the parts uniting a spoke with the wheel rim, and taken on a plane at right angles to that of the section of Fig. 1. Fig. 3 is a side elevation of the parts illustrated in Fig. 2.

In the drawings, A designates the hub of the wheel, and B the spokes radiating therefrom, these being of any usual or preferred construction.

C designates the rim of the wheel which, in the drawings, is represented as being composed of a wooden felly c, a metal rim c' outside of the felly, and a solid rubber tire c'' outside the metal rim.

The end of each spoke is reduced to form a tenon b on which is placed a cap D preferably of metal. This cap consists essentially of a plunger section d into which extends the tenon b, and a shell or casing d' surrounding the tenon and preferably extending somewhat beyond the end thereof. Between the shell d' and the plunger d is a free space surrounding the latter. The cap D can be formed of a single unitary piece of metal or of several pieces properly united, as may be preferred, and its exterior shape may be suited to the shape and style of the spoke upon which it is secured. Preferably the shell d' is of about the same exterior size transversely as the spoke.

E designates a socket in which is placed the coiled spring H that is located between the end of the spoke and the wheel rim. The plunger d at the end of the spoke bears against one end of the spring, while its opposite end rests upon the bottom or end of the socket E. The outer end of the latter extends into a recess J formed therefor in the wheel rim and is supported by a bearing F secured to the wheel rim by bolts G and nuts g. The socket E is provided with a pair of trunnions e, preferably located about midway between the ends of the socket, that rest in seats f formed therefor in the flanges or side walls of the bearing pieces F. The spring sockets E are thus pivotally connected with the rim, through the bearings F, in order to allow that freedom of movement between the spokes and rim which is necessary in wheels of the type to which my invention belongs and where the spokes are in effect extensible to a slight degree. The end of the spring socket E extends into the space between the plunger d and the casing d' of the cap D at the end of the spoke.

As each of the spokes is connected with the rim in the manner described it will be seen that the hub of the wheel, and incidentally the body of the vehicle which the wheel supports, is flexible or yieldingly supported by the springs H as they successively come below the axis of the wheel. By causing the inner end of the spring socket to enter the free space within the cap D there is formed between the two movable parts of the spoke (the spring socket being in effect and function a part of the spoke), a closed joint that is not objectionable in appearance and operates to hold the two parts of the spoke in proper relation to each other, and also serves to exclude dust and dirt from the spring chamber within the socket. At the inner end or bottom of the space surrounding the plunger of the cap D, into which the end of the spring socket enters, there may be placed a cushion I of elastic material, such as rubber, to prevent objectionable shocks and jars should the spring be sufficiently compressed to allow the end of the casing to reach the bottom of the socket or space in which it moves.

In order to protect the spring, and especially to guard against the entrance of moisture and dirt into the chamber it occupies, as well as to prevent heating and friction, I may insert into the spring chamber a lubricating material of such nature that its particles move freely among themselves, such as plumbago paste. This is indicated at K.

The spokes may be united by a band of metal L located between the hub and the caps D and united to the spokes by clips l.

What I claim is:—

1. A vehicle wheel having a hub with radiating spokes and an outer rim in which are formed recesses opposite the ends of the spokes, caps at the ends of the spokes, sockets formed with trunnions extending laterally therefrom and located between the ends thereof, the sockets having telescopic engagement with the caps at the ends of the spokes, springs in the sockets between them and the said caps, and bearing pieces secured to the wheel rim in which the trunnions of the spring sockets are pivotally seated, the said bearing pieces being perforated to permit the spring sockets to extend through them and into the recesses formed in the wheel rim.

2. A vehicle wheel having a hub with radiating spokes and an outer rim, the outer ends of the spokes being reduced, caps supported at the ends of the spokes each formed with a plunger section and a surrounding casing, leaving a free space between them, sockets, the outer ends of which enter recesses in the wheel rim and the inner ends of which enter the spaces between the plungers and the casing of the caps at the ends of the spokes, springs situated in the said sockets, against the inner ends of which the plungers of the spoke caps engage, and bearings secured to the wheel rim in which the spring sockets have pivotal support.

SILENUS D. BROOKS.

Witnesses:
HENRY SHOVE,
CHARLES N. MURDOCK.

---

Copies of this patent may be obtained for five cents each, by addressing the "Commissioner of Patents, Washington, D. C."